United States Patent [19]
Linden et al.

[11] Patent Number: 5,969,443
[45] Date of Patent: Oct. 19, 1999

[54] ELECTROMAGNETIC ACTUATING DEVICE

[75] Inventors: Christopher Linden, Neuwied; Stefan Helbing, Kruft, both of Germany

[73] Assignee: Lucas Industries Public Limited Company, United Kingdom

[21] Appl. No.: 09/009,453

[22] Filed: Jan. 20, 1998

Related U.S. Application Data

[63] Continuation of application No. PCT/EP96/03095, Jul. 15, 1996.
[51] Int. Cl.⁶ .......................... G09B 19/042; F16K 31/04
[52] U.S. Cl. ............................ 310/30; 137/529; 318/567; 318/620
[58] Field of Search ............................... 310/30; 318/567, 318/599, 620, 631, 644, 645, 687, 696; 137/529, 629.65

[56] References Cited

U.S. PATENT DOCUMENTS

| | | | |
|---|---|---|---|
| 5,067,524 | 11/1991 | Pickenhahn | 137/627.5 |
| 5,179,330 | 1/1993 | Nikolaus | 318/567 |

OTHER PUBLICATIONS

European Search Report for PCT Application No. PCT/EP96/03095.

*Primary Examiner*—Nestor Ramirez
*Assistant Examiner*—Judson H. Jones
*Attorney, Agent, or Firm*—Wood, Herron & Evans L.L.P.

[57] ABSTRACT

An electromagnetic actuating device comprises a solenoid coil to which a control current can be applied and an armature associated with the solenoid coil which is adapted to carry out movements which are dependent upon a control current flowing through the solenoid coil and a spring arrangement for biassing the armature into opposite directions, with a holding position being defined which is assumed by the armature at a holding current through the solenoid coil, with the holding current flowing through the solenoid coil being variable to a higher value or to a lower value with the armature not leaving the holding position, and both the higher and the lower current value being able to be dimensioned in such a manner that interference influences on the magnetic and spring forces which actuate the armature do not bring the armature from its holding position into an actuated position which is different from the holding position.

19 Claims, 3 Drawing Sheets

ELECTROMAGNETIC ACTUATING DEVICE

The present application is a continuation of applicant's PCT application PCT/EP96/03095, filed Jul. 15, 1996, currently pending, and claiming priority of German Patent No. 195 27 493.8 filed Jul. 25, 1995.

The invention relates to an electromagnetic actuating device comprising a solenoid coil to which a control current can be applied and an armature associated with said solenoid coil, which is adapted to carry out movements which are dependent upon a control current flowing through the solenoid coil and a spring arrangement for biassing the armature in opposite directions, with a holding position being defined which is assumed by the armature when a holding current flows through the solenoid coil.

Such electromagnetic actuating devices are, for example, employed for valves or the like.

An inherent problem is that in particular with rapid switching of the valve from one position to another position, interference influences (external forces, friction, wear, manufacturing tolerances, changes in the long-term behaviour etc.) which act on parts of the valve can result in an over-shooting of the armature so that the armature does not reach the desired, but rather another position. This can lead to considerable problems, in particular in safety-critical applications. This holds true all the more because there are applications where leaving the one position in order to reach the other position can invoke immediate interference influences so that prevention of the above described problem is particularly difficult.

In order to solve the problem, the holding current which flows through the solenoid coil of the above specified electromagnetic actuating device can be varied to a higher value or to a lower value without the armature leaving the holding position, and the higher as well as the lower value can be dimensioned in such a manner that interference influences acting on the magnetic and the spring forces which actuate the armature do not bring the armature into an actuated position which is different from the holding position.

Preferably, a control device for the control current of the electromagnetic actuating device is connected to the electromagnetic actuating device according to the invention with a value which is related to the position of the armature being sensed and submitted to a control device as a controlled variable, a control current being supplied by the control device to the solenoid coil as an actuating variable, and a set point as a command variable of the control device being externally specified for the value which is related to the position of the armature.

The control device is preferably operated according to a method wherein a holding current, a higher as well as a lower current value are specified in such a manner that interference influences acting on the magnetic and the spring forces which actuate the armature do not bring the armature into a first actuated position when it changes from a second actuated position into a holding position.

In order to bring the electromagnetic actuating device as accurately as possible into a (holding) position which is located between a first and a second position, the following approach is preferably used according to the invention:

a) Outputting a control current for the holding position of the electromagnetic actuating device as the actuating variable if a control deviation between a command variable and a controlled variable does not exceed the amount of a predetermined value;

b) outputting a control current for a first actuating position of the electromagnetic actuating device as the actuating variable if the control deviation between the command variable and the controlled variable is less than the predetermined value; and c) outputting a control current for a second actuating position of the electromagnetic actuating device as the actuacting variable if the control deviation between the command variable and the controlled variable exceeds the predetermined value.

The term "amount of a predetermined value" refers to the range between the negative value of the predetermined value and the positive value of the predetermined value. This is to ensure that a continuing control deviation does not result in a response of the controller, but that tolerances within the range are possible. The tolerance width can be changed by varying the predetermined value and can also be set to zero.

In order to determine the output current values, a method according to the invention comprising the following steps is carried out (prior to the actual operation of the electromagnetic actuating device) in a quasi learning operation:

a) Specifying a control current (I0) for the holding position of the electromagnetic actuating device as the actuating variable;

b) specifying a value which is related to the position of the armature in the holding position (P0);

c) incrementing the control current by a predetermined current increment and outputting the control current to the solenoid coil of the electromagnetic actuating device as the actuating variable until the value related to the position of the armature in the holding position changes by a predetermined value in the direction of the second actuated position; and d) storing the control current which is thus output as the higher current value.

In order to obtain particularly smooth switching operations, it is possible with the above described method according to the invention to decrease the control current determined in step c) by one current increment prior to the storing operation in step d).

In a similar manner the lower current value can be determined as follows:

e) Specifying a control current (I0) for the holding position as the actuating variable;

f) determining a value which is related to the position of the armature in the holding position (P0);

g) decrementing the control current by a predetermined current increment (In+1:=In−dI) and outputting the control current (In+1) to the solenoid coil of the electromagnetic actuating device as the actuating variable until the value related to the position of the armature in the holding position (P0) changes by a predetermined value in the direction of the first actuated position (P1); and h) storing the control current (I) which is thus output as the lower current value (I1).

In this case, too, the control current determined in step g) can be increased by one current increment (dI) prior to the storing operation in step h).

A value for the holding current which is particularly well suited for the operation of the electromagnetic actuating device can be determined from the higher and the lower current value.

The holding current is preferably determined as the arithmetic mean of the higher and the lower current value.

The invention and the method according to the invention for operating an electromagnetic actuating device will be explained in the following by means of an example of a valve arrangement for an electronically controlled brake booster.

In the drawings:

FIG. 1 schematically shows a section through a valve arrangement of an electronically controlled brake booster in a non-actuated condition;

FIG. 2 schematically shows a section through a valve arrangement of an electronically controlled brake booster in an actuated condition;

Figure 1:
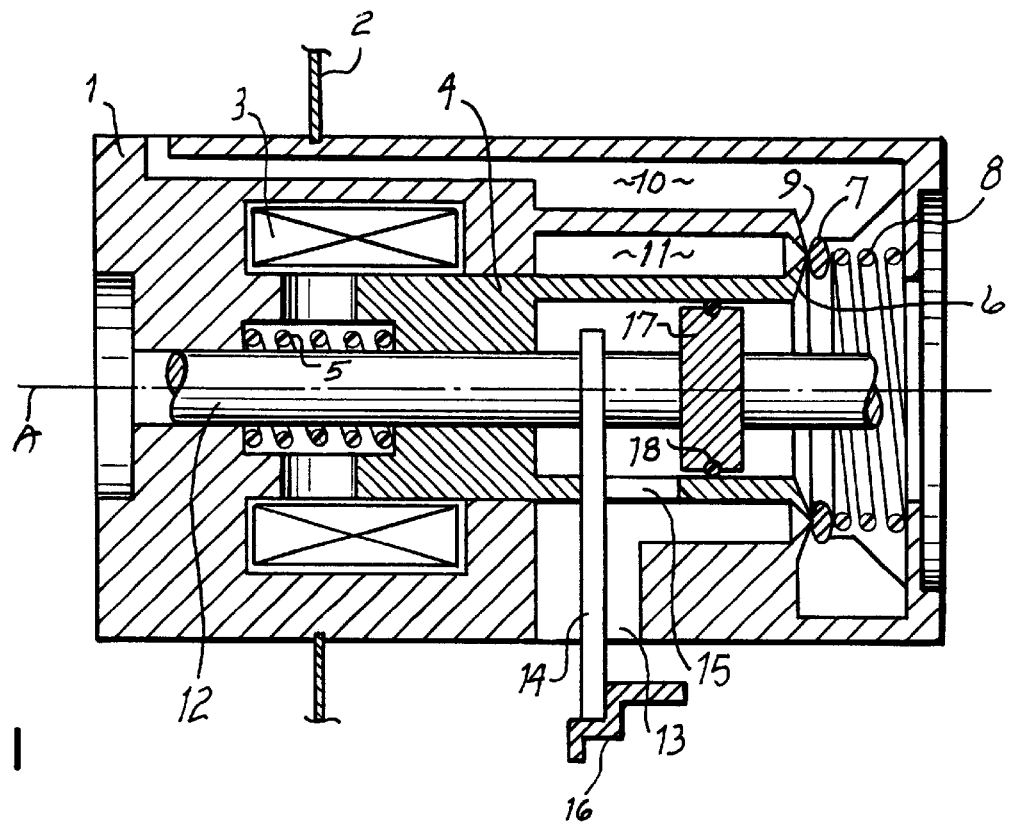
Figure 2:
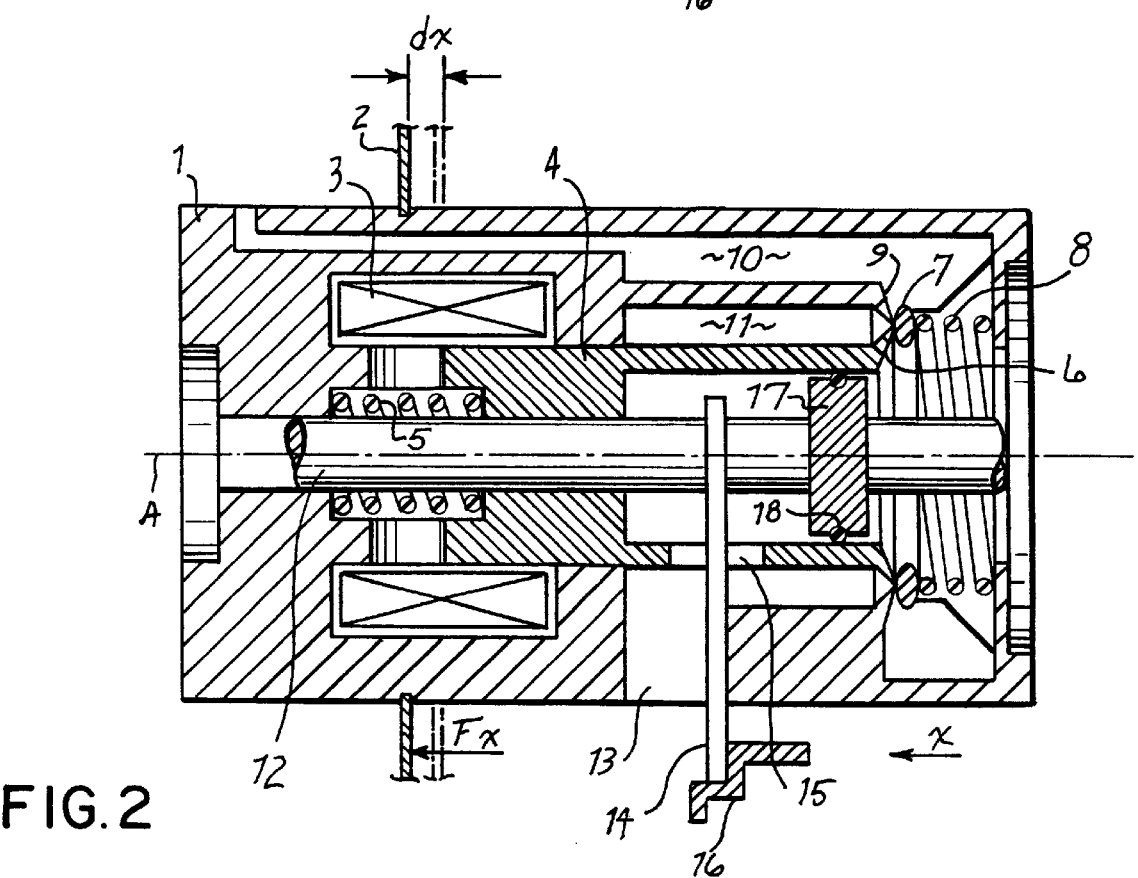

The valve arrangement which is schematically shown in FIGS. 1 and 2 of an electronically controlled brake booster is essentially rotation-symmetrical with respect to an axis A and comprises a housing 1 which is securely connected with a movable wall 2. The movable wall 2 divides the brake booster (not shown) into two chambers, with a vacuum chamber (not shown) being disposed on the l.h. side of the movable wall 2 and a pressure chamber (not shown) being disposed on the r.h. side of the movable wall 2. A pressure difference between the pressure and the vacuum chamber generates a force Fx at the movable wall 2. Said force Fx causes a displacement of the movable wall 2 in the x direction, thereby carrying the housing 1 with it.

The electromagnetic actuating device is arranged within the housing 1 and comprises a coil 3 and an armature 4 of a ring cylindrical shape, which is movable relative to the housing 1 with the aid of a first spring 5 opposite to the x direction. Inside the housing 1 an annular valve seat 9 is formed which is stationary with respect to the housing 1, and which separates a duct 10 which opens into the vacuum chamber (not shown) arranged on the one side of the movable wall 2 (l.h. side in FIG. 1) from a ring cylindrical space 11 which is defined by the armature 4 and annular valve seat 9, and which communicates with the pressure chamber (not shown) which is arranged on the other side of the movable wall 2 (r.h. side in FIG. 1). At the r.h. end of the armature 4 a concentric valve element 6 is formed. The valve seat 9 and the valve element 6 cooperate with an annular valve body 7. The valve body 7 is biassed towards the valve seat 9 or the valve element 6, respectively, by means of a second spring 8.

A piston 17 and a piston rod 12 connected with same are guided coaxially and within the ring cylindrical armature 4. The piston 17 is connected with an actuating device (not shown) which serves to mechanically actuate the brake booster (not shown) in a known manner. The piston 17 is sealed against the armature 4 or the valve element 6, respectively, via an annular sealing element 18 in the radial direction. On the one side of the sealing element 18 (r.h. side in FIG. 1) the atmospheric pressure constantly prevails.

The armature 4 or the valve element 6, respectively, comprises a recess 15 which is followed by the recess 13 in the housing 1. A stop member 14 is securely connected with the piston 17 or the piston rod 12, respectively, for the common axial movement and extends radially outwards through the recesses 15 and 13. With the mechanically non-actuated brake booster the piston 17 or the piston rod 12, respectively, assumes the rest position shown in FIGS. 1 and 2, in which the stop member 14 is in abutment with a stop 16 which is independent of the position of the housing 1.

The armature 4 or the valve member 6, respectively, is urged to the right by a first spring 5 which bears against the housing 1. With the non-actuated electromagnetic device according to FIG. 1 the armature 4 or the valve element 6, respectively, bears against the stop member 14 via the recess 15. Thereby the armature 14 assumes a certain position in the x direction in which the valve member 6 rests upon the valve body 7 in such a manner that the duct 10 which opens into the vacuum chamber, the space 11 which communicates with the pressure chamber, and the atmosphere at the r.h. side of the sealing element 18 are each shut off against each other.

When a current is applied to the coil 3 a magnetic force is exerted on the armature 4, which is directed to the left and thus counteracts the spring force exerted by the first spring 5. This moves the valve element 6 away from the valve body 7, and a connection from the pressure chamber to atmosphere is generated via the space 11, with said connection being shut off against the duct 10 associated with the vacuum chamber. Because the vacuum chamber is connected with a vacuum source (not shown) a pressure difference is generated at the movable wall 2, which exerts a force Fx in the x direction, under which force the housing 1 also moves in the x direction. Thereby the recess 15 in the armature 4 or the valve element 6, respectively, is displaced in the x direction to the left with respect to the stop member 14 so that the armature 4 or the valve member 6, respectively, is not supported by the stop member 14.

In the case of the actuating condition as shown in FIG. 2 the current flowing through the coil 3 is adjusted to such an amperage that the armature 4 assumes a certain position in which the valve member 6 rests upon the valve body 7 as in the non-actuated condition shown in FIG. 1 so that the duct 10, the space 11 and the atmosphere are shut off against each other. This maintains a pressure difference prevailing at the movable wall 2 so that the housing 1 is moved out of the rest position according to FIG. 1 by the travel dx. This is a so-called "holding position".

If on the basis of said "holding position" the current which flows through the coil 3 is reduced then the armature 4 and the valve element 6 are moved to the right under the effect of the spring force exerted by the first spring 5, with the valve body 7 being lifted off the stationary valve seat 9 against the effect of the force exerted by the second spring 8. This is achieved as a result of the second spring arrangement 8 having a smaller spring constant than the first spring arrangement 5. A connection is thereby created between the duct 10 and the space 11, with the atmosphere being shut off against this connection. This leads to a pressure compensating process between the pressure chamber and the vacuum chamber so that the pressure difference which prevails at the movable wall 2 is decreased. Consequently, this is a so-called "decreasing position".

A so-called "building-up position" is set on the basis of the "holding position" by increasing the current which flows through the coil 3 to such an extent that the armature 4 and the valve element 6 are moved in the x direction to the left against the effect of the first spring 5, with the valve element 6 being lifted off the valve body 7. This creates a connection from the atmosphere to the space 11, with the space 10 being shut off against this connection which as already explained leads to an increase in the pressure difference prevailing at the movable wall 2.

The magnetic force acting on the the armature 4 is a function of the current which flows through the coil 3. By varying the current through the coil 3 the position of the armature 4 in the x direction can be adjusted so that each desired pressure distribution can be set by a controlled timed change between the holding, decreasing and building-up position. The current supply to the coil 3 can be effected by current, voltage, or pulse width modulation signals from an electrical controller (not shown).

Figure 3:
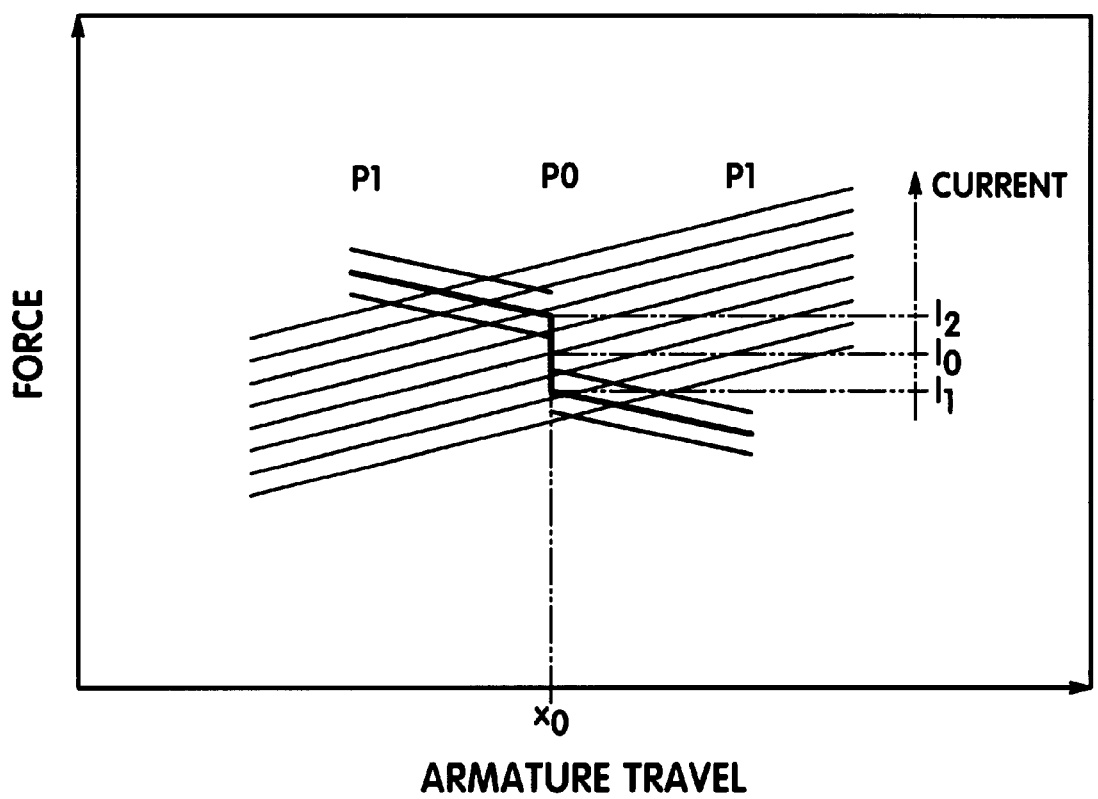
FIG. 3 shows an idealised diagram for explaining the control characteristic of an electromagnetic actuating device.

In the diagram according to FIG. 3 the travel of the armature 4 in the x direction is plotted along the abscissa, and the force acting on the armature 4 which results as a function of the current through the coil 3 according to the current curves is plotted along the ordinate. This is an idealised schematic illustration which relates to a working range which is designed in such a manner that a proportional relation exists between magnetic force and current. In addition, the control characteristic of the valve arrangement comprising valve element 6, valve body 7 and valve seat 9 is plotted. Said control characteristic has a total of three branches. In the case of the vertical branch a current range I1 to I2 is associated with a certain armature position x0. The position x0 corresponds exactly to the "holding position" in which the valve element 6 and the valve seat 9 sealingly rest upon the valve body 7. (The inclined branch following on the l.h. side of the vertical branch applies to a current above I2 and indicates the "building-up position", while the branch extending off to the r.h. side applies to a current below I1 and characterises the "decreasing position").

Due to interference influences which are caused, for example, by friction losses upon the movement of the armature 4 or the valve components 6, 7 which are coupled to same, or by tolerances of the first and second spring arrangement 5, 6, or by variations of external reaction forces including, in particular, variations of the compressive force proportion in the vacuum chamber in the case of a brake booster, the control characteristic is subject to a scatter band in the area of the two inclined branches. This is primarily critical for the accurate adjustment of the "holding position". If, for example, a switching from "building-up position" into holding position is desired, it is possible that switching takes place immediately after "building-up position", thus resulting in an abrupt pressure drop which, in particular in safety critical applications as in the case of an electronically controlled brake booster, can have serious consequences. In order to tackle this problem, a current I0 is always turned on which is obtained as an arithmetic mean value from the currents I1 and I2 because the arrangement is dimensioned in such a manner that the lower limit of the scatter band of the l.h. inclined branch and the upper limit of the scatter band of the r.h. inclined branch are not superimposed on one another.

Figure 4:
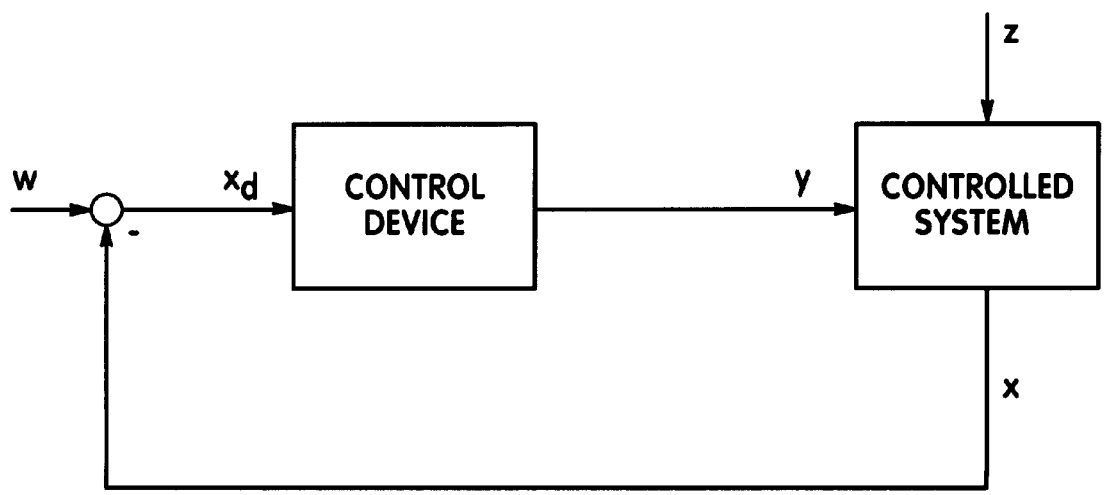
FIG. 4 shows the design of a simple closed control loop.

According to a preferred embodiment of the inventive method the electromagnetic actuating device is operated in a closed control loop as shown in FIG. 4. In this case, a controlled variable x from the controlled system, for example, the position of the armature 4 in the x direction is continuously sensed and compared with a command variable w. The result of this comparison is a control deviation xd which is supplied to a control device. The actuating y from the control device is the current supplied to the coil. The interference variables z which act upon the controlled system from the outside are primarily the above-mentioned influences due to friction, spring tolerances and reaction forces. In lieu of the immediate position of the armature 4 in the x direction a quantity which is related to the position of the armature 4 in the x direction can also be employed as a controlled variable. This is advantageous in that on the one hand intricate means for sensing the armature travel can be omitted and on the other hand costs can be saved for electronic components for regulating the current through the coil 3. In the case of an electronically controlled brake booster the controlled variable x could, for example, be the booster output pressure and/or the booster output force and/or the vehicle velocity and/or the vehicle deceleration, i.e. measuring values which, in any case, are sensed in the vehicle.

The invention also relates to an electromagnetic actuating device comprising a solenoid coil 3 and an armature 4 associated with the solenoid coil 3 which is adapted to carry out movements which are dependent upon a control current I flowing through the solenoid coil 3 and a spring arrangement 5, 8 for biassing the armature 4 into opposite directions, with a holding position P0 being defined by a stop 9 for a first element 8 of the spring arrangement which is assumed by the armature 4 loaded by a second element 5 of the spring arrangement and a magnetic force which results from a holding current through the solenoid coil 3 being opposed to the spring force of the first element 8 of the spring arrangement, with the spring characteristics of the elements 5, 8 of the spring arrangement being established in such a manner that a holding current I0 flowing through the solenoid coil 3 is variable to a higher value I2; I2>I0 or to a lower value I1; I1<I0, with the armature 4 not leaving the holding position P0, and both the higher and the lower current value I1, I2 being able to be dimensioned in such a manner that interference influences on the magnetic and spring forces which actuate the armature 4 do not bring the armature 4 from its holding position P0 into a first or a second actuated position P1, P2.

Figure 5:
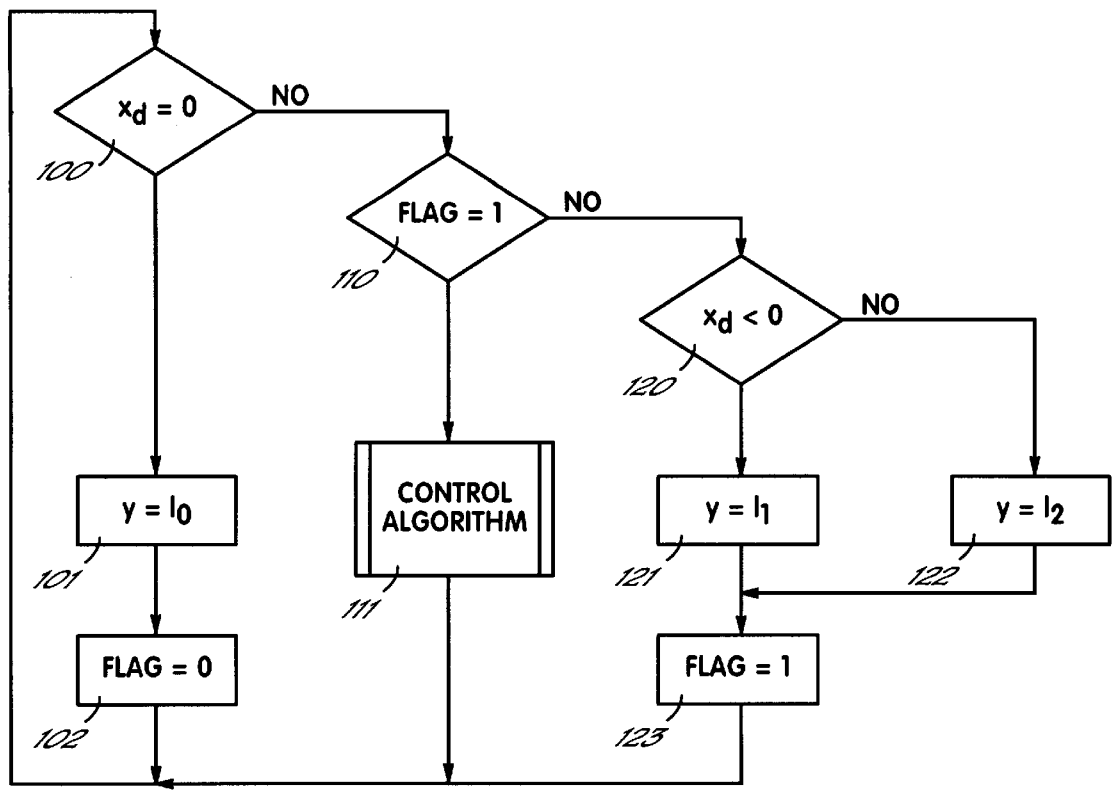
FIG. 5 shows a flow diagram of a method for controlling an electromagnetic actuating device.

FIG. 5 shows the control operation in the form of a flow diagram which is cyclically executed. In a first step 100 the control deviation xd is queried. If the control deviation sc has the value zero or a value in the order of zero, then in step 101 the actuating variable y is set to the current I0 for the "holding position". In addition, a flag is reset in step 102. The flag, when reset, indicates that the system is in "holding position" and, when set, that the system is in "building-up position" or "decreasing position" and that the actual control algorithm 111 is to be executed. If a control deviation is determined in step 100 the flag is queried in step 110. If the flag is still reset, the direction of the change of the control deviation xd is determined in step 120. If the control deviation is negative, then in step 121 the actuating variable y is set to the current I1 for the "decreasing position". If, however, the control deviation xd is positive, then in step 122 the actuating variable y is set to the current I2 for the "building-up position". The flag is then set in step 123 so that the control algorithm is able to be executed in the next cycle. Due to the fact that the actuating variable y is specified in accordance with the direction of change of the control deviation xd prior to the execution of the control algorithm 111, particularly short transients result in the control operation.

The control algorithm 111 can be both a parametric optimal and a structure optimal control type. In particular classical controllers with proportional and/or integral and/or differential behaviour are employed as parametric optimal types which are implemented either in the form of an electronic circuit or in the form of difference equations by means of programming a microcomputer. In the case of structure optimal types which are primarily programmed in a microcomputer, deadbeat controllers can, for example, be employed which are particularly suited for an adaptive control.

Figure 6:
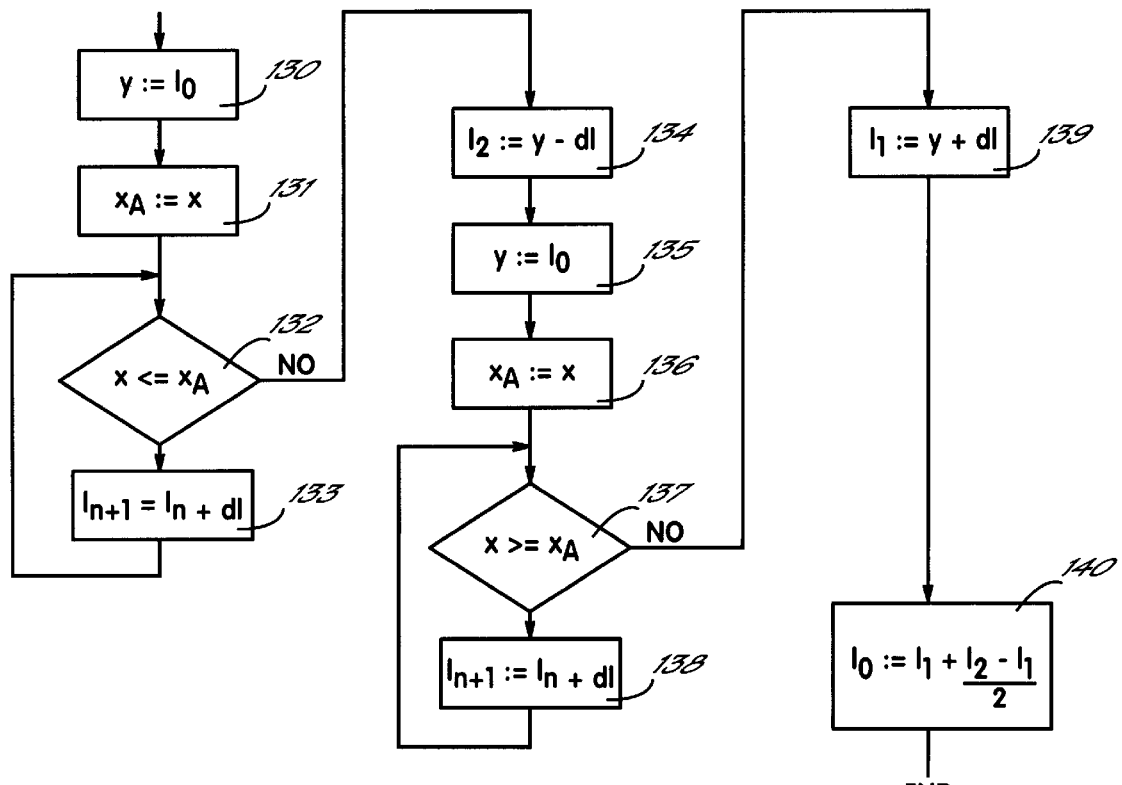
FIG. 6 shows a flow diagram of the method for learning the corner points of the control characteristic of an electromagnetic actuating device.

Due to the fact that the currents at the corner points I1, I2 and the current I0 which is derived therefrom are not uniquely defined, a learning process for determining the current values I0, I1 and I2 according to the valve control characteristic is provided which is shown in FIG. 6 in the form of a flow diagram. In step 130 the actuating variable y is first set to the holding current I0, and in step 131 the actual value of the controlled variable x is stored. Thereupon, a loop is passed through where in step 133 the actuating variable y is incremented until a change of the controlled variable x is determined in step 132. Subsequently, the value of the controlled variable y is stored under the value at the corner point I2 with a difference dI being subtracted. After the value at the corner point I2 has been determined, the actuating variable y is again set to the holding current I0 in step 135, and in step 136 the current value of the controlled variable x is buffered. As in the case of determination of the value at the corner point of I2, the value at the corner point of I1 is then determined, with the actuating variable y being decremented in step 138 until a change of the controlled variable x is detected in step 137. Upon subsequent storing of the value at the corner point of I1 in step 139, a difference dI is added to the actuating variable y. Since the values at the corner points of I1 and I2 have now been determined, the holding current I0 can be calculated as the arithmetic mean value in the final step 140.

The values at the corner points of I1 and I2 are specified as the first actuating variable in the controlling operation and are each shifted towards the holding current I0 by a difference dI. As a result the system remains in the "holding position" for at least the first control cycle, and subsequently a smooth transition takes place into the "building-up position" or the "decreasing position", whereby an overshooting which deteriorates the control quality is avoided.

The execution of the learning process for the values at the corner points of the currents I1 and I2 can, for example, be carried out once upon each starting operation of the system. It is, however, also possible to execute the learning process periodically, for example each time the arrangement is in a non-actuated condition. With reference to an electronically controlled brake booster this means that the learning process is executed at least at the start of a journey whenever the ignition is turned on, as well as periodically during the trip.

Finally, it should be noted that the field of application of the method according to the invention for the operation of an electromagnetic actuating device is not limited to an electronically controlled brake booster. Another application example would be a capacity control valve wherein the flow volume of the valve is adjustable as a function of the current which controls the electromagnetic device and which is covered in German patent application, File No. 195 18 333.9. A valve of this type assumes a mechanically defined rest position in the electrically non-actuated condition. Upon the application of a current to the electromagnetic device the armature or the valve body, respectively, of the valve assumes a certain control position due to a pressure difference prevailing at the pressure reduction stage of the valve, which cooperates with the electromagnetic force in accordance with a balance of forces. In this control position the flow volume through the valve can be varied within a current range by varying the current through the electromagnetic arrangement. Outside this current range, other valve functions such as pressure decreasing and pressure holding are adjustable. Generally, however, the predetermined control position is assigned a current range, with the values at the corner points due to external interference influences also lying in a scatter band. If a capacity control valve of this type is employed, for example, for the adjustment of the brake pressure in a vehicle braking system, the safety risk of an erroneous switching, e.g. a switching into pressure decreasing instead of into pressure build-up, can be excluded nearly completely by employing the method according to the invention.

We claim:

1. A method for the operation of a control device for the control current of an electromagnetic actuating device, the electromagnetic actuating device, comprising a solenoid coil (3) to which a control current (I) can be applied; and an armature (4) associated with the solenoid coil (3) which is adapted to carry out movements which are dependent upon a control current (I) flowing through the solenoid coil (3) and a spring arrangement (5, 8) for biasing the armature (4) into opposite directions, with a holding position (P0) being defined which is assumed by the armature (4) at a holding current (I0) through the solenoid coil (3);

with means for varying the current (I) flowing through the solenoid coil (3), being adapted to vary the holding current (I0) to a higher value (I2; I2>I0) or to a lower value (I1; I1<I0), with the armature (4) not leaving the holding position (P0), and both the higher and lower current value (I2, I1) being able to be dimensioned in such a manner that interference influences on the magnetic and spring forces which actuate the armature (4) do not bring the armature (4) from its holding position (P0) into a first or a second actuated position (P1, P2), the control device for the control current of the electromagnetic actuating device determining a value related to the position of the armature (4) and supplying it as the controlled variable (x), supplying a control current to the solenoid coil (3) as the actuating variable (y), and externally specifying a set point as the command variable (w) of the control device for the value which is related to the position of the armature (4), wherein the holding current (I0), a higher (I2; I2>I0) as well as a lower (I2; I2<I0) current value are specified in such a manner that interference influences acting on the magnetic and spring forces which actuate the armature (4) do not bring the armature (4) when it changes from an actuated position (P1, P2) which is different from the holding position (P0) into the holding position (P0) into an actuated position (P1, P2) which is different from the holding position (P0), the method comprising the steps of:

a) outputting a control current (I0) for the holding position (P0) of the electromagnetic actuating device as the actuating variable (y) if a control deviation (xd) between the command variable (w) and the controlled variable (x) does not exceed the amount of a predetermined value;

b) outputting a control current (I1) for a first actuating position (P1) of the electromagnetic actuating device as the actuating variable if the control deviation (xd) between the command variable (w) and the controlled variable (x) is less than the predetermined value; and c) outputting a control current (I2) for a second actuating position (P2) of the electromagnetic actuating device as the actuating variable if the control deviation (xd) between the command variable (w) and the controlled variable (x) exceeds the predetermined value.

2. The method for the operation of a control device according to claim 1, comprising the steps of:

a) executing a control algorithm if a control current (I0) for the holding position (P0) or a control current (I1) for a first actuated position (P1) or a control current (I2) for a second actuated position (P2) of the electromagnetic actuating device was output as the actuating variable (y); and/or b) executing a control algorithm if a control deviation (xd) between a command variable (w) and a controlled variable (x) exceeds the amount of a predetermined value.

3. The method for the operation of a control device according to claim 1, comprising the steps of:

a) specifying a control current (I0) for the holding position (P0) of the electromagnetic actuating device as the actuating variable (y);

b) specifying a value which is related to the position of the armature (4) in the holding position (P0);

c) incrementing the control current by a predetermined current increment (In+1:=In+dI) and outputting the control current (In−1) to the solenoid coil (3) of the electromagnetic actuating device as the actuating variable (y) until the value related to the position of the armature (4) in the holding position (P0) changes by a predetermined value in the direction of the second actuated position (P2); and d) storing the control (I) which is thus output as the higher current value (I2).

4. The method for the operation of a control device according to claim 3, wherein the control current (I) which is determined in step c) is decreased by one current increment (dI) prior to the storing operation in step d).

5. The method for the operation of a control device according to claim 1, comprising the steps of:

specifying a control current (I0) for the holding position (P0) of the electromagnetic actuating device as the actuating variable (y);

b) specifying a value which is related to the position of the armature (4) in the holding position (P0);

c) decrementing the control current by a predetermined current increment (In+1:=In−dI) and outputting the control current (In+1) to the solenoid coil (3) of the electromagnetic actuating device as the actuating variable (y) until the value related to the position of the armature (4) in the holding position (P0) changes by a predetermined value in the direction of the first actuated position (P1); and d) storing the control current (I) which is thus output as the lower current value (I1).

6. The method for the operation of a control device according to claim 5, wherein the control current (I) determined in the step c) is incremented by one current increment (dI) prior to the storing operation in step d).

7. The method for the operation of a control device according to claim 3, wherein a holding current (I0) for the operation of the electromagnetic actuating device is determined from the higher and the lower current value (I1, I2).

8. The method according to claim 7, wherein the holding current (I0) is determined as the arithmetic mean of the higher and the lower current value (I1, I2).

9. An electromagnetic actuating device, comprising a solenoid coil (3) to which a control current (I) can be applied and an armature (4) associated with the solenoid coil (3) which is adapted to carry out movements which are dependent upon a control current (I) flowing through the solenoid coil (3) and a spring arrangement (5, 8) for biasing the armature (4) into opposite directions, with a holding position (P0) being define as actuating variable (y) which is assumed by the armature (4) at a holding current (I0) through the solenoid coil (3);

with the holding current (I0) flowing through the solenoid coil (3) being variable to a higher value (I2; I2>I0) or to a lower value (I1; I1<I0), with the armature (4) not leaving the holding position (P0), and both the higher and the lower current value (I1, I2) being able to be dimensioned in such a manner that interference influences on the magnetic and spring forces which actuate the armature (4) do not bring the armature (4) from its holding position (P0) into a first or a second actuated position (P1, P2), with the higher current value (I2) being determined in such a manner that a value is determined which is related to the position of the armature (4) in the holding position (P0);

the control current is incremented by a predetermined current increment (In+1:=In+dI) and the control current (In+1) to the solenoid coil (3) of the electromagnetic actuating device as the actuating variable (y) is output until the value related to the position of the armature (4) in the holding position (P0) changes by a predetermined value in the direction of the second actuated position (P2);

and the lower current value (I1) being determined in such a manner that a value is determined which is relate to the position of the armature (4) in the holding position (P0);

the control current is decremented by a predetermined current increment (In+1:=In−dI) and the control current (In+1) to the solenoid coil (3) of the electromagnetic actuating device as the actuating variable (y) until the value to the position of aramature (4) in the holding position (P0) changes by a predetermined value in the direction of the first actuated position (P1).

10. A control device for the device for the control current of an electromagnetic actuating device according to claim 9, wherein a value related to the position of the armature (4) is sensed and supplied as the controlled variable (x) to a control device, a control current is supplied by the control device to the solenoid coil (3) as the actuating variable (y), and a set point as the command variable (w) of the control device is externally specified for the value which is related to the position of the armature (4).

11. A control device for the control current of an electromagnetic actuating device according to claim 10, wherein the holding current (I0), the higher (I2; I2>I0) as well as the lower (I2; I2>I0) current value are specified in such a manner that interference influences acting on the magnetic and spring forces which actuate the armature (4) do not bring the armature (4) when it changes form an actuated position (P1, P2) which is different form the holding position (P0) into the holding position (P0) into an actuated position (P2, P1) which is different from the holding position (P0).

12. The control device for the control current of an electromagnetic actuating device according to claim 10, wherein a control current (I0) for the holding position (P0)

of the electromagnetic actuating device is output as the actuating variable (x) if a control deviation (xd) between a command variable (w) and a controlled variable (x) does not exceed the amount of a predetermined value;

a control current (I1) for a first actuating position (p1) of the electromagnetic actuating device is output as the actuating variable if the control deviation (xd) between the command variable (w) and the controlled variable (x) is less than the predetermined value; and a control current (I2) for a second actuating position (P2) of the electromagnetic actuating device is output as the actuating variable if the control deviation (xd) between the command variable (w) and the controlled variable (x) exceeds the predetermined value.

13. The control device for the control current of an electromagnetic actuating device according to claim 10, which executes a control algorithm if a control current (I0) for the holding position (P0) or a control current (I1) for a first acutated position (P1) or a control current (I2) for a second actuated position (P2) of the electromagnetic actuating device was output as the actuating variable (y); and/or executes a control algorithm if a control deviation (xd) between a command variable (w) and a controlled variable (x) exceeds the amount of a predetermined value.

14. The control device for the control current of an electromagnetic actuating device according to claim 10, wherein the determined lower control current (I) is decreased by one current increment (dI) prior to the storing operation.

15. The control device for the control current of an electromagnetic actuating device according to claim 10, wherein the determined higher control current (I) is increased by one current increment (dI) prior to the storing in step d).

16. The control device for the control current of an electromagnetic actuating device according to claim 10, wherein a holding current (I0) for the operation of the electromagnetic actuating device is determined from the higher and the lower current value (I1, I2).

17. The control device for the control current of an electromagnetic actuating device according to claim 16, wherein the holding current (I0) is determined as the arithmetic mean of the higher and the lower current value (I1, I2).

18. The control device for the control current of an electromagnetic actuating according to claim 9, wherein the output lower control current (I) is stored as the lower current value (I1) and the higher control current (I) is stored as the higher control current (I2).

19. The electromagnetic actuating means according to claim 9, wherein a holding position (P0) is defined by a stop (9) for a first element (8) of the spring arrangement which is assumed the armature (4) loaded by a second element (5) of the spring arrangement and a magnetic force which results from a holding current through the solenoid coil (3) being opposed to the spring force of the first element (8) of the spring arrangement, with the spring arrangements, with the spring characteristics of the elements (5, 8) of the spring arrangement being established in such a manner that a holding current (I0) flowing through the solenoid coil (3) is variable to higher value (I2; I2>I0) or to a lower value (I1; I1<I0), with armature (4) not leaving the holding position (P0), and both the higher and the lower current value (I1, I2) being able to be dimensioned in such a manner that interference influences on the magnetic and spring forces which actuate the armature (4) do not bring the armature (4) from its holding position (P0) into a first or a second actuated position (P1, P2).

* * * * *